US007634911B2

(12) United States Patent
Brinkman

(10) Patent No.: US 7,634,911 B2
(45) Date of Patent: Dec. 22, 2009

(54) ENERGY RECOVERY SYSTEM

(75) Inventor: Jason L. Brinkman, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 341 days.

(21) Appl. No.: 11/819,779

(22) Filed: Jun. 29, 2007

(65) Prior Publication Data

US 2009/0000290 A1 Jan. 1, 2009

(51) Int. Cl.
*F16D 31/02* (2006.01)
*F15B 13/06* (2006.01)

(52) U.S. Cl. .............................. 60/414; 91/440; 91/533

(58) Field of Classification Search .................. 60/414; 91/437, 440, 450, 521, 533
See application file for complete search history.

(56) References Cited

U.S. PATENT DOCUMENTS

| | | | |
|---|---|---|---|
| 3,477,347 | A | 11/1969 | Rice |
| 4,345,436 | A | 8/1982 | Johnson |
| 5,868,059 | A | 2/1999 | Smith |
| 6,151,894 | A | 11/2000 | Endo et al. |
| 6,358,174 | B1 | 3/2002 | Folsom et al. |
| 6,378,301 | B2 | 4/2002 | Endo et al. |
| 6,467,264 | B1 | 10/2002 | Stephenson et al. |
| 6,502,393 | B1 | 1/2003 | Stephenson et al. |
| 6,584,769 | B1 | 7/2003 | Bruun |
| 6,615,786 | B2 | 9/2003 | Mori et al. |
| 6,655,136 | B2 | 12/2003 | Holt et al. |
| 6,718,759 | B1 | 4/2004 | Tabor |
| 6,739,127 | B2 | 5/2004 | Nippert et al. |
| 6,748,738 | B2 | 6/2004 | Smith |
| 6,789,387 | B2 | 9/2004 | Brinkman |

FOREIGN PATENT DOCUMENTS

| | | | |
|---|---|---|---|
| EP | 1413773 B1 | | 4/2004 |
| WO | WO-00/00748 | | 1/2000 |

*Primary Examiner*—Michael Leslie
(74) *Attorney, Agent, or Firm*—Finnegan, Henderson, Farabow, Garrett & Dunner

(57) ABSTRACT

An energy recovery system for a machine is disclosed. The energy recovery system may have a pump configured to provide a flow of pressurized fluid. The energy recovery system may also have a first fluid actuator with a first chamber and a second chamber and being configured to receive the pressurized fluid, a second fluid actuator with a third chamber and a fourth chamber and being configured to receive the pressurized fluid, and a first valve fluidly connected between the pump and the first and second actuators. The energy recovery system may additionally include an isolation unit with a first selectively restrictable passageway fluidly connecting the first chamber, the third chamber, and a first outlet of the first valve, and a second selectively restrictable passageway fluidly connecting the second chamber, the fourth chamber, and a second outlet of the first valve, as well as an energy recovery unit in fluid communication with the isolation unit. The isolation unit may be configured to direct a flow of pressurized fluid from the second actuator to the energy recovery unit. The energy recovery unit may be configured to convert the flow of pressurized fluid to a first mechanical power output.

20 Claims, 4 Drawing Sheets

ENERGY RECOVERY SYSTEM

TECHNICAL FIELD

The present disclosure relates generally to an energy recovery system and, more particularly, to a system and method for accumulating and using recovered hydraulic energy.

BACKGROUND

Construction machines such as, for example, dozers, loaders, excavators, motor graders, and other types of heavy machinery use one or more hydraulic actuators to accomplish a variety of tasks. These actuators are fluidly connected to a pump on the construction machine that provides pressurized fluid to chambers within the actuators. As the pressurized fluid moves into or through the chambers, the pressure of the fluid acts on hydraulic surfaces of the chambers to effect movement of the actuator and a connected work tool. When the pressurized fluid is drained from the chambers it is returned to a low pressure sump on the construction machine.

One problem associated with this type of hydraulic arrangement involves efficiency. In particular, the fluid draining from the actuator chambers to the sump has a pressure greater than the pressure of the fluid already within the sump. As a result, the higher pressure fluid draining into the sump still contains some energy that is wasted upon entering the low pressure sump. This wasted energy reduces the efficiency of the hydraulic system. In addition, the fluid emptying to the low pressure reservoir is passed through a throttle valve to control a lowering or retracting speed of the actuator. Throttling the fluid also results in a loss or waste of energy and undesired heating of the hydraulic fluid.

Some attempts have been made to recover this otherwise wasted energy. For example, U.S. Pat. No. 6,584,769 (the '769 patent), issued to Bruun on Jul. 1, 2003, discloses a hydraulic circuit including an engine, three hydraulic pumps, an accumulator, a double-acting hydraulic cylinder, and several associated control valves. The first of the three pumps can be used to extend and retract the hydraulic cylinder in a normal manner, in which energy stored in the hydraulic fluid discharged from the cylinder is lost. A second of the three pumps is connected to the engine and, along with the accumulator, can be used to capture hydraulic energy stored in the head end of the hydraulic cylinder when retracting the hydraulic cylinder under an overrunning load. When operating in an energy recovery mode, pressurized hydraulic fluid from the head end of the hydraulic cylinder is discharged through the second pump and into the accumulator. If the pressure in the head end of the hydraulic cylinder is higher than that in the accumulator, the fluid drives the second pump like a motor, thereby creating a mechanical power output that returns energy to the engine. When extending the cylinder, pressurized fluid from the accumulator is supplied to the head end of the cylinder. A third of the three pumps is used as a pilot pump to provide pressurized fluid to control valves that regulate the flow of fluid between the cylinder, the second pump, and the accumulator.

Although the system of the '769 patent may recover some hydraulic energy when operating under an overrunning load, it may require large components and a greater number of components that may increase the size, complexity, and cost of the system. Because all of the fluid from the head end of the cylinder is discharged to the accumulator, the large size of the required accumulator may make packaging of the system difficult. Also, when the cylinder is retracted quickly under the force of gravity, a large quantity of fluid may be rapidly discharged from the cylinder, and the second pump/motor may need to be large to accommodate the rapid flow and large volume of fluid. The '769 patent system also requires an excessive number of hydraulic pumps, which may reduce the efficiency of the system and increase the control complexity and cost of the system.

The disclosed machine system is directed to overcoming one or more of the problems set forth above.

SUMMARY OF THE DISCLOSURE

An energy recovery system for a machine is disclosed. The energy recovery system may have a pump configured to provide a flow of pressurized fluid. The energy recovery system may also have a first fluid actuator with a first chamber and a second chamber and being configured to receive the pressurized fluid, a second fluid actuator with a third chamber and a fourth chamber and being configured to receive the pressurized fluid, and a first valve fluidly connected between the pump and the first and second actuators. The energy recovery system may additionally include an isolation unit with a first selectively restrictable passageway fluidly connecting the first chamber, the third chamber, and a first outlet of the first valve, and a second selectively restrictable passageway fluidly connecting the second chamber, the fourth chamber, and a second outlet of the first valve, as well as an energy recovery unit in fluid communication with the isolation unit. The isolation unit may be configured to direct a flow of pressurized fluid from the second actuator to the energy recovery unit. The energy recovery unit may be configured to convert the flow of pressurized fluid to a first mechanical power output.

Another aspect of the present disclosure is directed to a method of recovering energy from a hydraulic system. The method may include pressurizing a fluid and directing a first flow of the pressurized fluid to a first chamber of a first actuator to lower a load during an overrunning condition. The method may also include directing a second flow of the pressurized fluid from a first chamber of a second actuator connected to the load into a second chamber of the second actuator. The method may further include generating a mechanical power output from a third flow of the pressurized fluid from the first chamber of the second actuator. The fluid in the first chamber of the second actuator may be pressurized by the load during the overrunning condition.

DETAILED DESCRIPTION

Figure 1:
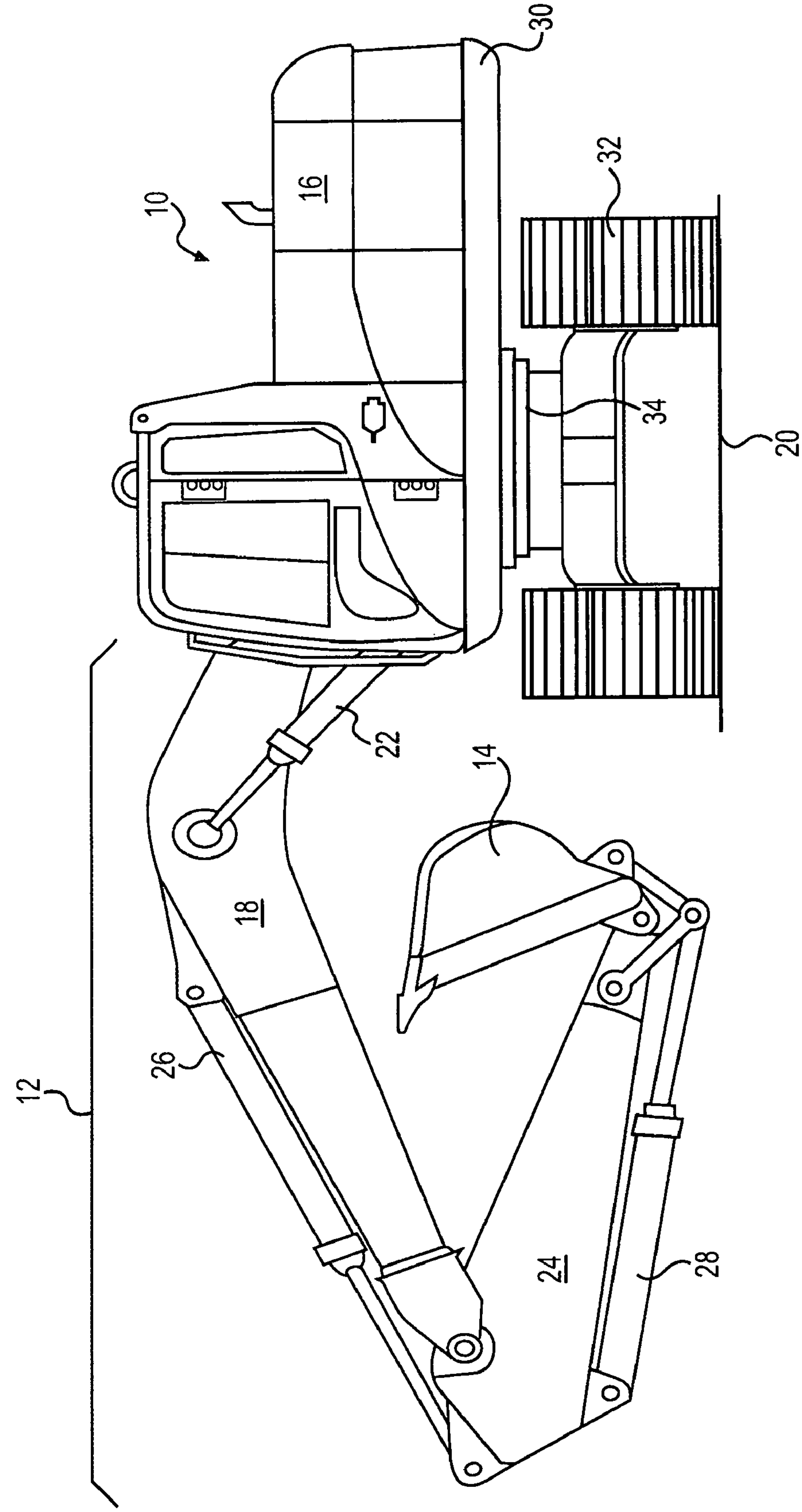
FIG. 1 is a pictorial illustration of an exemplary disclosed machine.

FIG. 1 illustrates an exemplary machine 10 having multiple systems and components that cooperate to accomplish a task. Machine 10 may embody a fixed or mobile machine that performs some type of operation associated with an industry such as mining, construction, farming, transportation, or any other industry known in the art. For example, machine 10 may be an earth moving machine such as the excavator depicted in FIG. 1. Alternatively, machine 10 may be a dozer, a loader, a backhoe, a motor grader, a haul truck, or any other earth-moving or task-performing machine. Machine 10 may include an implement system 12 configured to move a work tool 14, and a power source 16 that drives implement system 12.

Implement system 12 may include a linkage structure moved by fluid actuators to position and operate work tool 14. Specifically, implement system 12 may include a boom member 18 that is vertically pivotal about an axis relative to a work surface 20 by a pair of adjacent, double-acting, boom actuators 22 (only one shown in FIG. 1). Implement system 12 may also include a stick member 24 that is vertically pivotal about an axis in the same plane as boom member 18 by a single, double-acting, stick actuator 26. Implement system 12 may further include a single, double-acting, tool actuator 28 operatively connected to work tool 14 to pivot work tool 14 in the vertical direction. Boom member 18 may be pivotally connected to a frame member 30 of machine 10, which may be pivoted in a transverse direction relative to an undercarriage 32 by a swing actuator 34. Stick member 24 may pivotally connect work tool 14 to boom member 18. It is contemplated that a greater or lesser number of fluid actuators may be included within implement system 12 and/or connected in a manner other than described above, if desired.

Numerous different work tools 14 may be attachable to a single machine 10 and controllable by an operator of machine 10. Work tool 14 may include any device used to perform a particular task such as, for example, a bucket, a fork arrangement, a blade, a shovel, a ripper, a dump bed, a broom, a snow blower, a propelling device, a cutting device, a grasping device, or any other task-performing device known in the art. Although connected in the embodiment of FIG. 1 to pivot and swing relative to machine 10, work tool 14 may alternatively or additionally slide, rotate, lift, or move in any other manner known in the art in response to an operator input.

Power source 16 may embody an engine such as, for example, a diesel engine, a gasoline engine, a gaseous fuel-powered engine, or any other type of combustion engine known in the art. It is contemplated that power source 16 may alternatively embody a non-combustion source of power such as a fuel cell, an accumulator, or another source known in the art. Power source 16 may produce a mechanical or electrical power output that may then be converted to hydraulic power for moving actuators 22, 26, 28 and 34.

Figure 2:
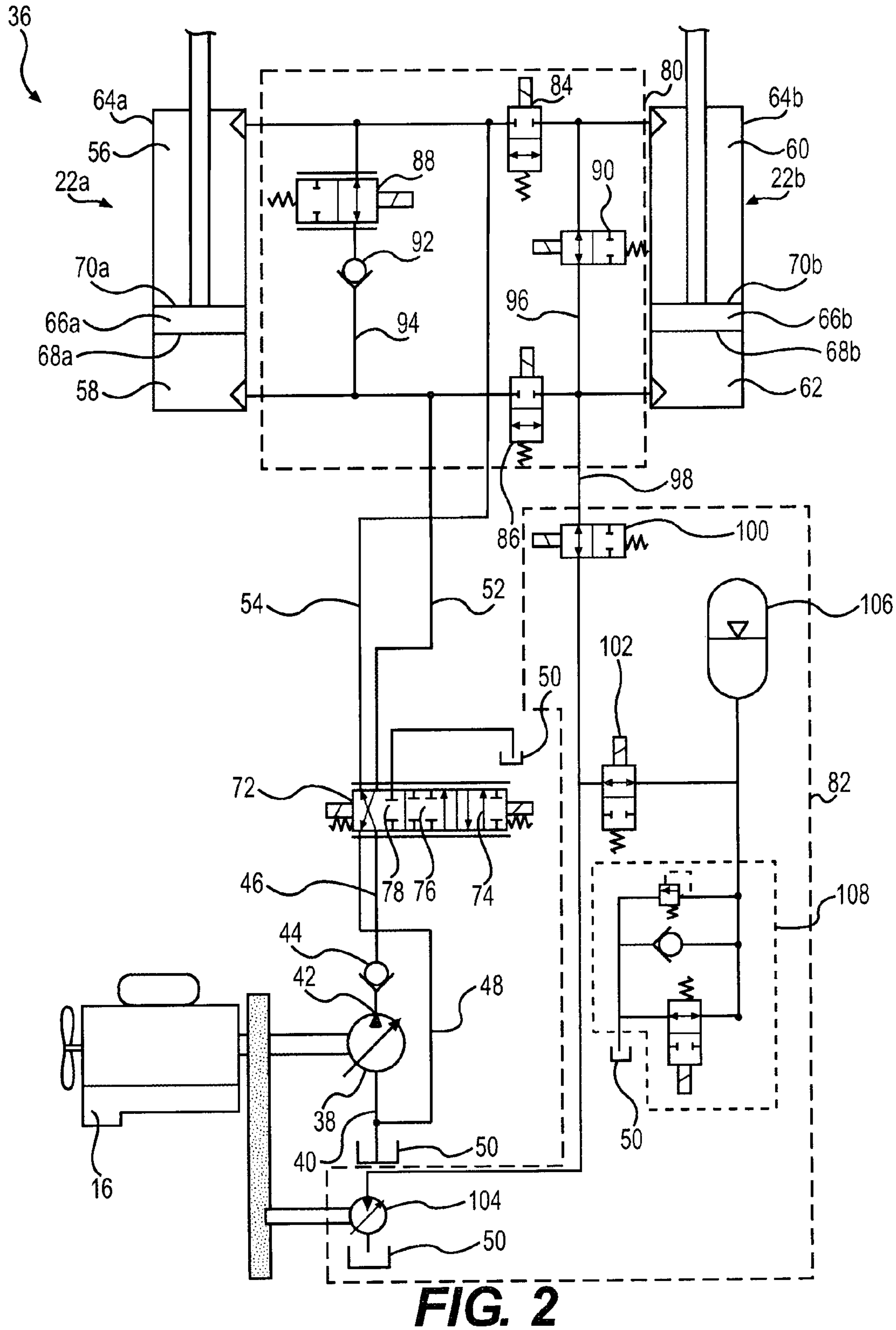
FIG. 2 is a schematic and diagrammatic illustration of an exemplary disclosed hydraulic system for use with the machine of FIG. 1.

As illustrated in FIG. 2, machine 10 may include a hydraulic system 36 having a plurality of fluid components that cooperate to move work tool 14 (referring to FIG. 1). Specifically, hydraulic system 36 may include a tank 50 holding a supply of fluid, and a pump 38 configured to pressurize the fluid and direct the pressurized fluid to boom actuators 22. Hydraulic system 36 may also include an actuator control valve 72, an isolation unit 80, and an energy recovery unit 82 configured to recover energy from the fluid in boom actuators 22. It is contemplated that hydraulic system 36 may include additional and/or different components such as, for example, pressure relief valves, makeup valves, pressure-balancing passageways, temperature sensors, position sensors, acceleration sensors, and other components known in the art.

Tank 50 may constitute a reservoir configured to hold a supply of fluid. The fluid may include, for example, a dedicated hydraulic oil, an engine lubrication oil, a transmission lubrication oil, or any other fluid known in the art. One or more hydraulic systems within machine 10 may draw fluid from and return fluid to tank 50. It is also contemplated that hydraulic system 36 may be connected to multiple, separate tanks. Tank 50 may receive fluid from hydraulic system 36 via return passageway 48, and/or via other return lines emanating from various other devices, as described below.

Pump 38 may be connected to draw fluid from tank 50 via a suction inlet 40, and to pressurize the fluid to a predetermined level. Pump 38 may embody a variable displacement pump configured to produce a variable flow of pressurized fluid. Pump 38 may be drivably connected to power source 16 by, for example, a countershaft, a belt, an electrical circuit, or in any other suitable manner, such that an output rotation of power source 16 results in a pumping action of pump 38. Alternatively, pump 38 may be connected indirectly to power source 16 via a torque converter, a gear box, or in any other manner known in the art. Pump 38 may discharge the pressurized fluid through discharge outlet 42 and a supply passageway 46 to actuator control valve 72. A check valve 44 may be installed in supply passageway 46 downstream of actuator control valve 72 to provide for a unidirectional flow of fluid from pump 38. It is contemplated that multiple sources of pressurized fluid may be interconnected to supply pressurized fluid to hydraulic system 36, if desired.

Boom actuator 22 may comprise a first actuator **22*a* and a second actuator 22*b*, both connected to boom member 18 to raise and lower boom member 18 (referring to FIG. 1) in unison. Actuators 22*a* and 22*b* may each include a tube 64*a* or 64*b*, and a piston assembly 66*a* or 66*b* disposed within tube 64*a* or 64*b* to form two separate chambers. First actuator 22*a* may contain a first chamber 56 and a second chamber 58, while second actuator 22*b* may contain a third chamber 60 and a fourth chamber 62. Chambers 56, 58, 60, and 62 may be selectively supplied with pressurized fluid and drained of the pressurized fluid to cause piston assembly 66*a* and 66*b* to displace within tubes 64*a* and 64*b*, thereby changing the effective length of boom actuator 22. The flow rate of fluid into and out of chambers 56, 58, 60, and 62 may relate to a velocity of first and second actuators 22*a* and 22*b*, while a pressure differential between first and second chambers 56 and 58 and between third and fourth chambers 60 and 62 may relate to a force imparted by actuators 22*a* and 22*b* on boom member 18. A head end passageway 52 may connect actuator control valve 72 to second chamber 58 and fourth chamber 62. A rod end passageway 54 may connect actuator control valve 72 to first chamber 56 and third chamber 60**.

With reference to first actuator **22*a*, piston assembly 66*a* may include a first hydraulic surface 68*a* and a second hydraulic surface 70*a* disposed opposite first hydraulic surface 68*a*. An imbalance of force caused by fluid pressure on first and second hydraulic surfaces 68*a* and 70*a* may result in movement of piston assembly 66*a* within tube 64*a*. For example, a force on first hydraulic surface 68*a* being greater than a force on second hydraulic surface 70*a* may cause piston assembly 66*a* to displace to increase the effective length of first actuator 22*a*. Similarly, when a force on second hydraulic surface 70*a* is greater than a force on first hydraulic surface 68*a*, piston assembly 66*a* may retract within tube 64*a* to decrease the effective length of first actuator 22*a*. Second actuator 22*b* may have a similar tube 64*b* and piston assembly 66*b*, with first and second hydraulic surfaces 68*b* and 70*b***, respectively.

Actuator control valve 72 may be a proportional, solenoid-operated valve having a first position 74, a second position 76, and a third position 78, and being configured to regulate the motion of boom actuators 22. In the first position 74, actuator control valve 72 may connect supply passageway 46 to head end passageway 52, and return passageway 48 to rod end passageway 54. In the second position 76, the actuator control valve 72 may isolate actuators **22*a* and 22*b* from pump 38. In the third position 78, actuator control valve 72 may connect supply passageway 46 to rod end passageway 54, and return passageway 48 to head end passageway 52. Actuator control valve 72 may be moved between the three positions by actuating a solenoid against the bias of a spring from the second position to the first and third positions. Actuator control valve 72 may be movable to any position between the first, second, and third positions to vary the rate of flow into actuators 22***a* and 22*b*, thereby affecting the velocity of piston assembly 66*a* and 66*b*. It is contemplated that actuator control valve 72 may alternatively be hydraulically actuated, mechanically actuated, pneumatically actuated, or actuated in any other suitable manner. It is also contemplated that actuator control valve 72 may alternatively embody multiple valve elements configured to perform the same functions, if desired.

Isolation unit 80 may be in fluid communication with actuator control valve 72 through head end passageway 52 and rod end passageway 54. Isolation unit 80 may selectively direct hydraulic fluid to the chambers of actuators 22*a* and 22*b* to extend and retract piston assemblies 66*a* and 66*b*, and to direct fluid to energy recovery unit 82 during an overrunning load condition. Isolation unit 80 may include a second valve 84, a third valve 86, a fourth valve 88, and a fifth valve 90, each of which may include a solenoid actuated, spring biased valve mechanism configured to move between a first closed position, at which flow is blocked, and a second open position, at which flow is permitted. Isolation unit 80 may also include a check valve 92 located proximal to fourth valve 88.

Second valve 84 may be associated with rod end passageway 54 and configured to prevent fluid flow into third chamber 60 from rod end passageway 54 when in its closed position. Third valve 86 may be associated with head end passageway 52 and configured to prevent fluid flow into fourth chamber 62 from head end passageway 52 when in its closed position. Fourth valve 88 may be associated with a first actuator passageway 94 and located between first chamber 56 and second chamber 58 to selectively permit fluid flow from second chamber 58 to first chamber 56 when in its open position. Check valve 92 may be any type of check valve commonly known in the art, and may be located proximal to fourth valve 88 to permit fluid flow in only one direction (i.e. from second chamber 58 to first chamber 56) when fourth valve 88 is in its open position. Alternatively, a check valve may be integrated into the same housing as fourth valve 88, such that fourth valve 88 and check valve 92 become a unitary valve. Fifth valve 90 may be associated with second actuator passageway 96 and located between third chamber 60 and fourth chamber 62 to selectively permit fluid flow between third chamber 60 and fourth chamber 62, when in its open position. It is contemplated that second valve 84, third valve 86, fourth valve 88, and fifth valve 90 may alternatively be hydraulically, mechanically, or pneumatically actuated, or actuated in any other suitable manner known in the art.

Energy recovery unit 82 may be in fluid communication with isolation unit 80 through recovery passageway 98. Energy recovery unit 82 may include a sixth valve 100, a seventh valve 102, a motor 104, and an accumulator 106. Energy recovery unit 82 may recover fluid energy by using the fluid to turn motor 104 and produce a mechanical torque output. Sixth valve 100 and seventh valve 102 may each include a solenoid actuated, spring biased valve mechanism configured to move between a first closed position at which flow is blocked, and a second open position at which fluid flow is permitted. Sixth valve 100 may be associated with recovery passageway 98 and configured to permit fluid flow to energy recovery unit 82 when in its open position. Seventh valve 102 may be located adjacent to accumulator 106 and configured to permit fluid flow to accumulator 106, when in its open position.

Motor 104 may be a variable displacement motor coupled to power source 16 and configured to receive a pressurized fluid. Motor 104 may receive pressurized fluid from recovery passageway 98, and discharge the fluid to tank 50. Motor 104 may also use the energy contained within the pressurized fluid to generate a mechanical torque output passed to power source 16. Motor 104 may be connected to power source 16 through a power takeoff commonly known in the art. Motor 104 may connect to power source 16 without any intervening power interruption mechanism, such as, for example, a clutch, and may therefore constantly rotate with power source 16. A gearbox (not shown) may be disposed between motor 104 and power source 16, if desired, to control the rotational speed of motor 104. When pressurized fluid flows through motor 104, a mechanical torque output may be produced and transmitted to power source 16.

Accumulator 106 may embody a vessel filled with a compressible gas and configured to store pressurized fluid for future use as a source of power. The compressible gas may include, for example, nitrogen or another appropriate (i.e. non-flammable) compressible gas. As fluid in communication with accumulator 106 exceeds a predetermined pressure, it may flow into accumulator 106. Because the nitrogen gas is compressible, it may act like a spring and compress as the fluid flows into accumulator 106. When the pressure of the fluid within recovery passageway 98 drops, the compressed nitrogen within accumulator 106 may expand and urge the fluid from within accumulator 106 to exit. It is contemplated that accumulator 106 may alternatively embody a spring biased type of accumulator or any other type of fluid storage device known in the art, if desired. It is contemplated that accumulator 106 may be optional. That is, that energy recovery unit 82 may operate without accumulator 106, and/or may operate with seventh valve 102 in a closed position. When operating with seventh valve 102 in a closed position and/or without accumulator 106, pressurized fluid from isolation unit 80 may simply flow directly to motor 104.

Energy recovery unit 82 may include an accumulator valve 108. Accumulator valve 108 may include one or more valve elements configured to provide functions such as, for example, pressure relief, if the pressure in accumulator 106 exceeds a certain level, fluid makeup that may allow motor 104 to draw fluid from tank 50, and/or a directional control that may allow accumulator 106 to drain to tank.

Figure 3:
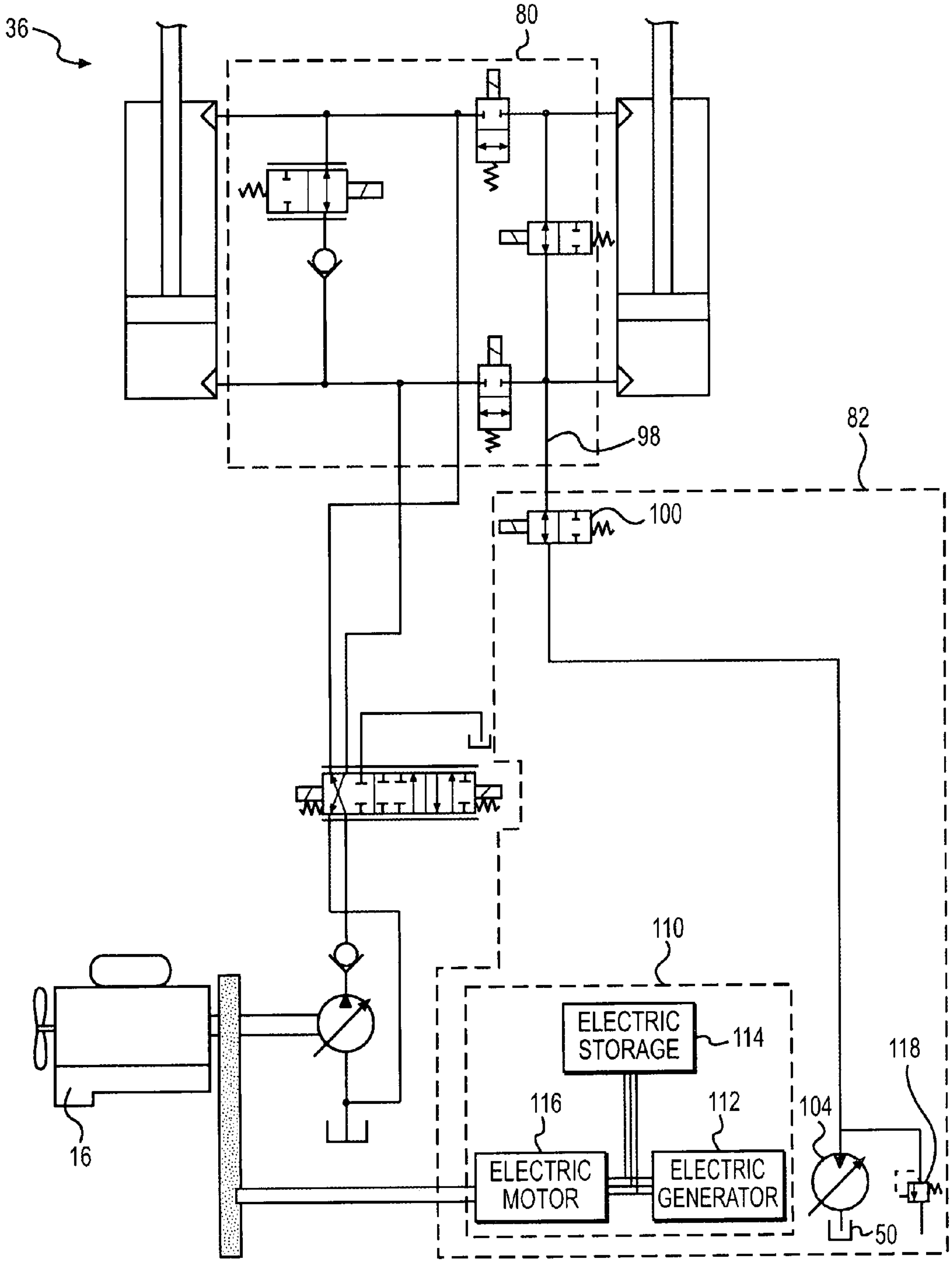
FIG. 3 is a schematic and diagrammatic illustration of another exemplary disclosed hydraulic system for use with the machine of FIG. 1.

FIG. 3 shows an alternative embodiment of energy recovery unit 82, which may include recovery passageway 98, sixth valve 100, motor 104, electrical accumulator unit 110, and drain valve 118. Recovery passageway 98, sixth valve 100 and motor 104 may perform substantially the same functions as in the embodiment of energy recovery unit of FIG. 2. However, in this second embodiment of energy recovery unit 82, motor 104 may be coupled to generator 112 of electrical accumulator unit 110. Electrical accumulator unit 110 may include the aforementioned generator 112, an electrical storage unit 114, and an electric motor 116. Drain valve 118 may allow an excess of pressurized fluid to be drained from energy recovery unit 82 to tank 50.

Generator 112 may be a generator commonly known in the art that converts a mechanical energy input to an electrical energy output. Generator 112 may be coupled to an output shaft (not shown) of motor 104, and generate an electrical power output from a mechanical power input. Electrical storage unit 114 may be a device commonly known in the art for storing electrical energy, such as, for example, a battery, a battery pack, or a capacitor. Electrical storage unlit 114 may be connected to receive and store electrical energy from generator 112. Electric motor 116 may be connected to electrical storage unit 114 and configured to convert electrical energy into a mechanical output. Electric motor 116 may be connected to power source 16 through a power takeoff commonly known in the art. Electric motor 116 may connect to power source 16 without any intervening power interruption mechanism such as, for example, a clutch, and may therefore constantly rotate with power source 16. A gearbox (not shown) may be disposed between electric motor 116 and power source 16, if desired, to control the rotational speed of electric motor 116. When electrical energy from generator 112 and/or electrical storage unit 114 passes through electric motor 116, a mechanical torque output may be produced and transmitted to power source 16.

It is contemplated that electrical energy from electrical storage unit 114 may be discharged through electric motor 116 in a manner commonly known in the art. For example, the electrical energy may be discharged in a steady flow, or it may be discharged as needed to provide energy to power source 16 when power source 16 is under a heavy, transient load. It is also contemplated that if electrical storage unit 114 has no stored energy, that electrical energy from generator 112 may directly drive electric motor 116.

The operation of the exemplary embodiments shown in FIGS. 2 and 3 will be described in detail below.

INDUSTRIAL APPLICABILITY

The disclosed energy recovery system may be applicable to any machine that includes a hydraulic actuator where efficiency, consistent performance of a driving power source, and low cost are important factors. The disclosed energy recovery system may capture energy that would otherwise be wasted during the normal operation of the machine and stores this energy in the form of pressurized fluid within an accumulator. The pressurized fluid stored in the accumulator may be used to perform a future operation of the machine such as, for example, torque assisting an associated power source. The disclosed hydraulic system may improve efficiency by recuperating energy from fluid expelled from the hydraulic actuator, and improve power source operational consistency by selective torque assisting the power source. The operation of hydraulic system 36 shown in FIG. 2 will now be explained.

Actuators 22*a* and 22*b* may be moveable by pressurized fluid in a variety of different nodes, and in response to an operator request. One such typical mode may be the retraction or lowering of boom 18 during an overrunning load condition. In an overrunning load condition, the load on boom 18 may be sufficient to cause actuators 22*a* and 22*b* to retract under the force of the load alone. In such a situation, the weight of a load may cause piston assemblies 66*a* and 66*b* to force fluid from second chamber 58 and fourth chamber 62 at an elevated pressure, compared with the pressure in tank 50.

To lower boom 18, an operator may move an interface device (not shown) to signal hydraulic system 36 that a lowering operation is desired. To initiate the lowering operation, actuator control valve 72 may move to the third position 78, thereby connecting supply passageway 46 with rod end passageway 54, and return passageway 48 to head end passageway 52. When an overrunning condition is sensed via a pressure sensor (not shown), isolation unit 80 may take advantage of the overrunning load by using energy recovery unit 82 to generate mechanical power from the pressurized fluid forced from second actuator 22*b*. During an overrunning condition, second valve 84 and third valve 86 may be moved to their closed positions, and fourth valve 88 and fifth valve 90 may be moved to their open positions. Sixth valve 100 and seventh valve 102 may also be moved to their open positions.

Moving valves 84, 86, 88, and 90 of the isolation unit and valves 100 and 102 of energy recovery unit 82 in such a manner may result in the recovery of hydraulic energy. In particular, the flow of pressurized fluid from pump 38 may pass through actuator control valve 72, through rod end passageway 54, and into first chamber 56. A portion of the fluid from second chamber 58 may pass through fourth valve 88 and into first chamber 56. The remainder of the fluid from second chamber 58 may pass through head end passageway 52, through actuator control valve 72, and return passageway 48 to tank 50. A portion of the fluid from fourth chamber 62 may flow through fifth valve 90 to third chamber 60, and the remainder of the fluid from fourth chamber 62 may flow through sixth valve 100 to energy recovery unit 82.

Once inside of energy recovery unit 82, the pressurized fluid may flow to accumulator 106 and to motor 104. Fluid will flow to accumulator 106 until the pressure of the fluid in accumulator 106 substantially matches the pressure of the fluid in fourth chamber 62, at which point the fluid will flow through motor 104. Within motor 104, the flow of pressurized fluid may cause motor 104 to rotate and generate torque, thereby returning power from the fluid to power source 16.

After boom 18 has lowered to the desired level, pump 38, actuator control valve 72, and isolation unit 80 may return to normal operation. Sixth valve 100 may move to its closed position, thereby isolating energy recovery unit 82. Upon isolation, pressurized fluid may continue to flow from accumulator 106 to motor 104, producing a torque to power source 16, until the pressure of the fluid in accumulator 106 substantially matches the pressure of the fluid ill tank 50. It is contemplated, however, that another overrunning event may occur prior to complete discharge of accumulator 106. In this way, there may be a nearly continuous supply of pressurized fluid from isolation unit 80 and/or accumulator 106 to motor 104, thereby providing a nearly continuous mechanical torque from motor 104 to power source 16.

The operation of the second embodiment of hydraulic system 36 shown in FIG. 3 may be substantially similar to the embodiment shown in FIG. 2. However, the energy recovery unit 82 of FIG. 3. may operate differently from the energy recovery unit 82 shown in FIG. 2. Under all overrunning load, pressurized fluid may flow from isolation unit 80 into energy recovery unit 82 of FIG. 3 through recovery passageway 98 and valve 100, which may be maintained in an open position. The pressurized fluid may flow through motor 104, which may produce a mechanical power output, which turns generator 112. Electrical energy produced by generator 112 may be stored in electrical storage unit 114. Electrical storage unit 114 may release electrical energy to electric motor 116, which may produce a mechanical power output that is transmitted to power source 16.

Figure 4:
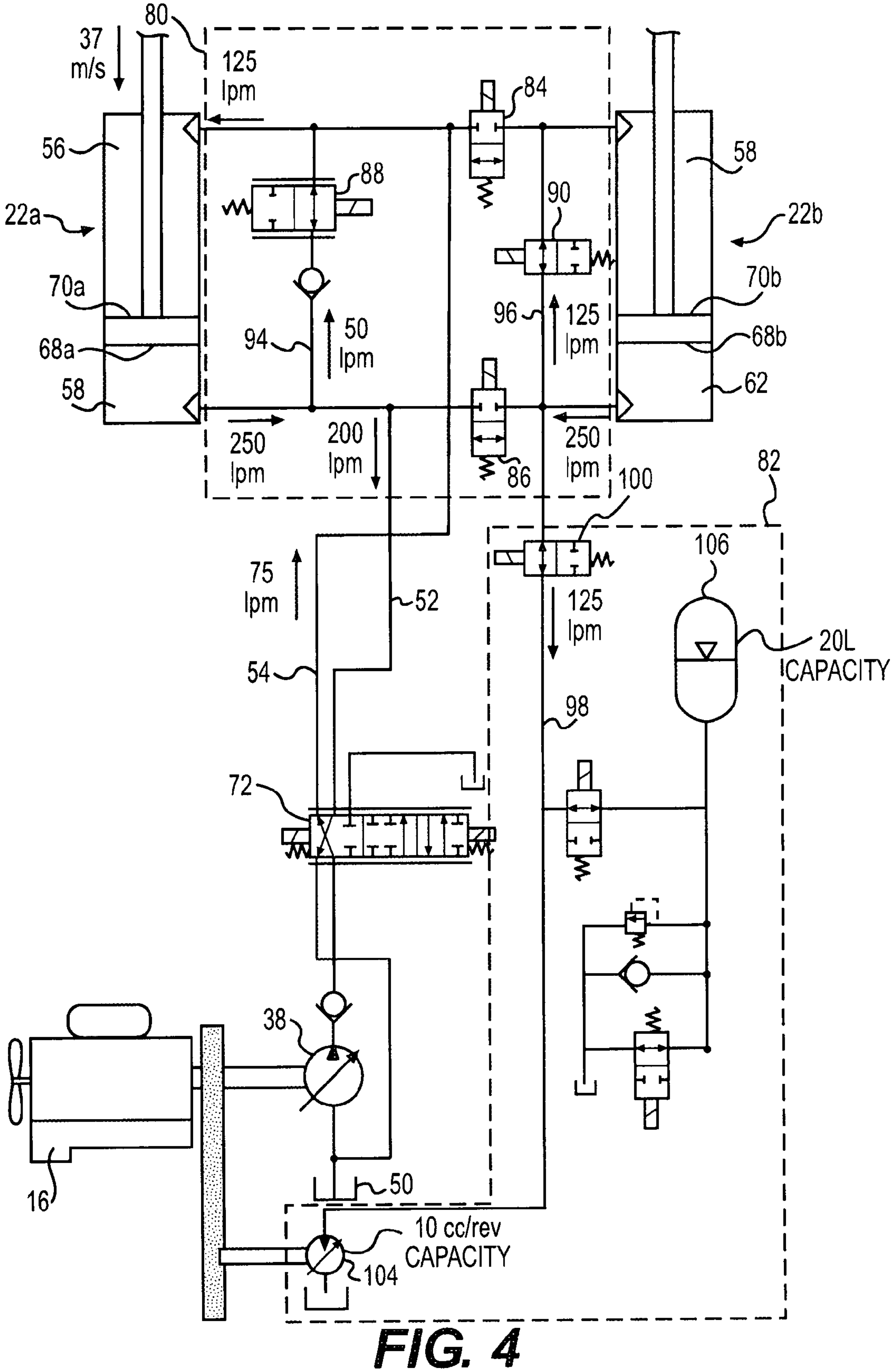
FIG. 4 is another schematic and diagrammatic illustration of the exemplary disclosed hydraulic system of FIG. 2.

The operation of hydraulic system 36 may be better understood by the example shown in FIG. 4. FIG. 4 is a schematic and diagrammatic illustration of hydraulic system 36 shown in FIG. 2., configured for lowering boom 18 (not shown in FIG. 4) under an overrunning load and showing exemplary flow rates at various points in the system. In this example, an operator may signal hydraulic system 36 to lower boom 18 at a rate that causes actuators 22*a* and 22*b* to retract at a speed of 0.37 meters per second. This desired speed may require pump 38 to produce a flow of about 75 liters per minute (lpm). Because the area of first hydraulic surfaces 68*a* and 68*b* may be about twice the area of second hydraulic surfaces 70*a* and 70*b*, about 250 liters per minute (lpm) of fluid may be expelled from both second chamber 58 and fourth chamber 62, and both first chamber 56 and second chamber 58 may require about 125 lpm each. Pump 38 may be set to provide 75 lpm of flow, all of which may pass through actuator control valve 72 into rod end passageway 54, and into first chamber 56. The other 50 lpm of flow required by first chamber 56 may be provided from second chamber 58, while the remaining 200 lpm flow from second chamber 58 may return through head end passageway 52, through actuator control valve 72, and into tank 50. The 125 lpm flow required by third chamber 60 may be supplied by fourth chamber 62, while the remaining 125 lpm from fourth chamber 62 may pass through sixth valve 100 to energy recovery unit 82. To accommodate the 125 lpm of flow, motor 104 may be a 10 cubic centimeter/revolution motor, and accumulator 106 may be a 20 liter accumulator.

While the hydraulic system 36 of FIGS. 2 and 3 described in the previous example may not accommodate all of the fluid discharged from second chamber 58 and fourth chamber 62 under an overrunning load, and some of the pressurized fluid may be returned to tank 50, the operation of hydraulic system 36 may represent an advantageous compromise between the amount of energy recovered and the size of the components required to recover the energy. That is, if hydraulic system 36 was configured to recover all of the energy from the pressurized fluid in second chamber 58 and fourth chamber 62, motor 104 may require a capacity of 125 cc/rev motor, and accumulator 106 may need to have a capacity of 40 L. However, by recovering only a portion of the fluid energy stored in fourth chamber 62, the system of the present disclosure may increase overall machine efficiency, while minimizing the necessary size of components required to recover the energy. This increased efficiency and reduced component size may also help reduce overall system acquisition and operating costs.

It will be apparent to those skilled in the art that various modifications and variations can be made to the disclosed energy recovery system without departing from the scope of the disclosure. Other embodiments of the energy recovery system will be apparent to those skilled in the art from consideration of the specification and practice of the energy recovery disclosed herein. It is intended that the specification and examples be considered as exemplary only, with a true scope of the disclosure being indicated by the following claims and their equivalents.

What is claimed is:

1. An energy recovery system comprising:

a pump configured to provide pressurized fluid;

a first fluid actuator having a first chamber and a second chamber and being configured to receive the pressurized fluid;

a second fluid actuator having a third chamber and a fourth chamber and being configured to receive the pressurized fluid;

a first valve fluidly connected between the pump and the first and second actuators;

an isolation unit having a first selectively restrictable passageway fluidly connecting the first chamber, the third chamber, and a first outlet of the first valve, and a second selectively restrictable passageway fluidly connecting the second chamber, the fourth chamber, and a second outlet of the first valve; and an energy recovery unit in fluid communication with the isolation unit, wherein the isolation unit is configured to direct a flow of pressurized fluid from the second actuator to the energy recovery unit; and the energy recovery unit is configured to convert the flow of pressurized fluid to a first mechanical power output.

2. The energy recovery system of claim 1, wherein the isolation unit is configured to direct the flow of pressurized fluid to the energy recovery unit when the first and second fluid actuators are operating in an overrunning load condition.

3. The energy recovery system of claim 1, wherein the isolation unit further includes:

a second valve located in the first selectively restrictable passageway and being configured to restrict fluid flow between the first and third chambers;

a third valve located in the second selectively restrictable passageway and being configured to restrict fluid flow between the second and fourth chambers;

a fourth valve located in a third passageway between the first and second chambers and being configured to allow unidirectional fluid flow from the second chamber to the first chamber; and a fifth valve located in a fourth passageway between the third and fourth chambers and being configured to allow fluid flow between the third chamber and fourth chamber.

4. The energy recovery system of claim 3, wherein:

the flow of pressurized fluid is a first flow of pressurized fluid from the fourth chamber to the energy recovery unit; and the isolation unit is further configured to:

direct pressurized fluid from the pump to the first chamber;

direct a second flow of pressurized fluid from the second chamber to the first chamber;

direct a third flow of pressurized fluid from the second chamber to the tank;

direct a fourth flow of pressurized fluid from the fourth chamber to the third chamber.

5. The energy recovery system of claim 4, wherein the first flow of pressurized fluid is about half of the fluid contained within the fourth chamber.

6. The energy recovery system of claim 1, wherein the energy recovery unit includes:

a sixth valve configured to fluidly connect the energy recovery unit to the isolation unit; and a first motor configured to convert the flow of pressurized fluid to the first mechanical power output.

7. The energy recovery system of claim 6, wherein the energy recovery unit further includes:

an accumulator configured to store the flow of pressurized fluid from the isolation unit and to release the pressurized fluid to the first motor; and a seventh valve configured to fluidly connect the accumulator to the energy recovery unit.

8. The energy recovery system of claim 6, wherein the energy recovery unit further includes:

a generator connected to the first motor and configured to convert the first mechanical power to an electrical power output;

an electric storage unit configured to store the electrical power from the generator; and a second motor configured to convert the electrical power from the generator and the stored electrical power from the electric storage unit into a second mechanical power output.

9. A method of recovering energy from a hydraulic system, comprising:

pressurizing a fluid;

directing a first flow of the pressurized fluid to a first chamber of a first actuator to lower a load during an overrunning condition;

directing a second flow of the pressurized fluid from a first chamber of a second actuator connected to the load into a second chamber of the second actuator; and generating a first mechanical power output from a third flow of the pressurized fluid from the first chamber of the second actuator, wherein the fluid in the first chamber of the first actuator and in the first chamber of the second actuator is pressurized by the load during the overrunning condition.

10. The method of claim 9, further including:

restricting a fluid exchange between the first and second actuators;

directing a fourth flow of pressurized fluid from a second chamber of the first actuator into the first chamber of the first actuator; and directing a fifth flow of pressurized fluid from the second chamber of the first actuator to a reservoir.

11. The method of claim 10, further including;

directing the third flow of the pressurized fluid to an accumulator; and generating the first mechanical power output from the pressurized fluid by providing the third flow of pressurized fluid to a first motor after the accumulator is full of pressurized fluid.

12. The method of claim 11, further including:

isolating the accumulator and the first motor from the first and second actuators; and generating the first mechanical power output by providing pressurized fluid from the accumulator to the first motor.

13. The method of claim 9, wherein the third flow of the pressurized fluid is about half of the fluid contained within the first chamber of the second actuator.

14. The method of claim 9, further including:

generating an electrical output from the first mechanical power output;

storing the electrical output;

generating a second mechanical power output from the electrical output and the stored electrical output.

15. A machine, comprising:

a power source;

a tank configured to hold a supply of fluid;

a pump driven by the power source to draw fluid from the tank and pressurize the fluid;

a work tool;

a first fluid actuator having a first chamber and a second chamber and being configured to receive the pressurized fluid and move the work tool;

a second fluid actuator having a third chamber and a fourth chamber and being configured to receive the pressurized fluid and move the work tool in unison with the first fluid actuator;

a first valve fluidly connected between the pump and the first and second actuators;

an isolation unit fluidly connected between the first valve and the first and second actuators; and an energy recovery unit in fluid communication with the isolation unit and being configured to convert a first flow of pressurized fluid to a first mechanical power output and input the first mechanical power output to the power source, wherein the isolation unit is configured to:

selectively restrict fluid communication between the first actuator and the energy recovery unit;

selectively restrict fluid communication between the second actuator and the first valve; and selectively direct the first flow of pressurized fluid to the energy recovery unit when the first and second fluid actuators are operating in an overrunning load condition.

16. The machine of claim 15, wherein the isolation unit includes:

a first passageway fluidly connecting the first chamber to the third chamber and to a first outlet of the first valve;

a second passageway fluidly connecting the second chamber to the fourth chamber and to a second outlet of the first valve;

a second valve configured to restrict fluid communication between the first and third chambers;

a third valve configured to restrict fluid communication between the second and fourth chambers;

a fourth valve configured to allow unidirectional fluid flow from the second chamber to the first chamber; and a fifth valve configured to allow fluid communication between the third chamber and fourth chamber;

wherein the isolation unit is further configured to:

direct pressurized fluid from the pump to the first chamber;

direct a second flow of pressurized fluid from the second chamber to the first chamber;

direct a third flow of pressurized fluid from the second chamber to the tank;

direct a fourth flow of pressurized fluid from the fourth chamber to the third chamber; and direct the first flow of pressurized fluid from the fourth chamber to the energy recovery unit when the first and second fluid actuators are operating in an overrunning load condition.

17. The machine of claim 16, wherein the first flow of pressurized fluid is about half of the fluid contained within the fourth chamber.

18. The machine of claim 15, wherein the energy recovery unit includes:

a sixth valve configured to fluidly connect the energy recovery unlit to the isolation unit; and a first motor connected configured to convert the first flow of pressurized fluid to the first mechanical power output.

19. The machine of claim 18, wherein the energy recovery unit further includes:

an accumulator configured to store the pressurized fluid from the isolation unit and to release the pressurized fluid to the first motor; and a seventh valve configured to fluidly connect the accumulator to the energy recovery unit;

wherein the first motor is further configured to transmit the first mechanical power output to the power source.

20. The machine of claim 18, wherein the energy recovery unit further includes:

a generator connected to the first motor and configured to convert the first mechanical power to an electrical power output;

an electric storage unit configured to store the electrical power from the generator; and a second motor configured to:

convert the electrical power from the generator and the stored electrical power from the electric storage unit into a second mechanical power output; and transmit the second mechanical power output to the power source.

* * * * *

UNITED STATES PATENT AND TRADEMARK OFFICE
CERTIFICATE OF CORRECTION

PATENT NO. : 7,634,911 B2
APPLICATION NO. : 11/819779
DATED : December 22, 2009
INVENTOR(S) : Brinkman It is certified that error appears in the above-identified patent and that said Letters Patent is hereby corrected as shown below:

Please correct the Drawing as follows:
Sheet 4 of 4, lines 1-2, in Fig. 4, delete “37 m/s” and insert -- .37 m/s --.

Please correct the Specification as follows:
Column 7, line 1, delete “unlit” and insert -- unit --.

Column 7, line 47, delete “nodes,” and insert -- modes, --.

Column 8, line 33, delete “ill” and insert -- in --.

Column 8, line 44, after “Under” delete “all” and insert -- an --.

Please correct the Claims as follows:
Column 9, line 47, in claim 1, delete “system” and insert -- system, --.

Column 12, line 41, in claim 18, delete “unlit” and insert -- unit --.

Signed and Sealed this

First Day of June, 2010

David J. Kappos
*Director of the United States Patent and Trademark Office*